(12) United States Patent
Wilcox

(10) Patent No.: US 6,185,634 B1
(45) Date of Patent: Feb. 6, 2001

(54) ADDRESS TRIGGERED DMA CONTROLLER WITH AN INDICATIVE SIGNAL INCLUDING CIRCUITRY FOR CALCULATING A NEW TRIGGER ADDRESS VALUE BASED ON THE SUM OF THE CURRENT TRIGGER ADDRESS AND THE DESCRIPTOR REGISTER DATA WITH A TRIGGER ADDRESS REGISTER

(75) Inventor: Jeffrey Wilcox, Westford, MA (US)

(73) Assignee: EMC Corporation, Hopkinton, MA (US)

( * ) Notice: Under 35 U.S.C. 154(b), the term of this patent shall be extended for 0 days.

(21) Appl. No.: 08/720,102

(22) Filed: Sep. 27, 1996

(51) Int. Cl.[7] .............................. G06F 13/28; G06F 3/00
(52) U.S. Cl. ............................................... 710/26; 710/56
(58) Field of Search .................................. 395/842, 846, 395/826, 825; 710/22, 48, 23, 20, 26, 21, 28, 52; 711/146

(56) References Cited

U.S. PATENT DOCUMENTS

| | | | | |
|---|---|---|---|---|
| 4,599,689 | * | 7/1986 | Berman ................................. | 710/22 |
| 4,864,533 | * | 9/1989 | Hanada ................................. | 395/846 |
| 4,989,135 | * | 1/1991 | Miki ..................................... | 710/48 |
| 5,159,671 | * | 10/1992 | Iwami ................................... | 710/20 |
| 5,179,709 | * | 1/1993 | Bailey et al. ........................ | 710/23 |
| 5,214,767 | * | 5/1993 | Wanner et al. ...................... | 710/22 |
| 5,239,659 | * | 8/1993 | Rudeseal et al. ................... | 395/182.04 |
| 5,333,274 | * | 7/1994 | Amini et al. ........................ | 714/50 |
| 5,379,381 | * | 1/1995 | Lamb .................................... | 710/6 |
| 5,485,624 | * | 1/1996 | Steinmetz et al. .................. | 712/34 |
| 5,537,646 | * | 7/1996 | Buck et al. .......................... | 395/500 |
| 5,551,006 | * | 8/1996 | Kulkarni .............................. | 711/146 |
| 5,572,660 | * | 11/1996 | Jones ................................... | 714/6 |
| 5,590,377 | * | 12/1996 | Smith ................................... | 710/22 |
| 5,623,700 | * | 4/1997 | Parks et al. ......................... | 710/53 |
| 5,632,016 | * | 5/1997 | Hoch et al. .......................... | 710/30 |
| 5,636,188 | * | 6/1997 | Funahashi ........................... | 369/32 |
| 5,644,784 | * | 7/1997 | Peek .................................... | 710/24 |
| 5,652,915 | * | 7/1997 | Jeter et al. .......................... | 710/52 |
| 5,659,777 | * | 8/1997 | Iwasaki et al. ..................... | 709/226 |
| 5,687,392 | * | 11/1997 | Radko ................................. | 710/22 |
| 5,768,557 | * | 6/1998 | Kulkarni .............................. | 711/146 |
| 5,835,733 | * | 11/1998 | Walsh et al. ........................ | 710/101 |

* cited by examiner

Primary Examiner—Kevin J. Teska
Assistant Examiner—W. Thomson
(74) Attorney, Agent, or Firm—John M. Gunther; Leanne J. Fitzgerald; David N. Caracappa (57) ABSTRACT

An address triggered DMA controller includes a DMA engine for controlling transfer of data between an external device and locations in a memory designated by respective addresses. Such a DMA controller also includes a DMA monitor for monitoring the respective addresses, and if one of the respective addresses matches a predetermined value, generating a signal to indicate a match.

11 Claims, 7 Drawing Sheets

ADDRESS TRIGGERED DMA CONTROLLER
WITH AN INDICATIVE SIGNAL INCLUDING
CIRCUITRY FOR CALCULATING A NEW
TRIGGER ADDRESS VALUE BASED ON THE
SUM OF THE CURRENT TRIGGER
ADDRESS AND THE DESCRIPTOR
REGISTER DATA WITH A TRIGGER
ADDRESS REGISTER

FIELD OF THE INVENTION

The present invention relates to a DMA controller which monitors the addresses involved in a DMA transfer, and generates a signal when a predetermined address is involved in the DMA transfer.

BACKGROUND OF THE INVENTION

Present computer systems include one or more main, or host, processors, each including associated memory for storing programs to be executed and data to be processed. Such systems also include one or more input/output (I/O) peripheral device controllers. The host processors, memory, and peripheral device controllers are all coupled together by a system bus. Such peripheral device controllers may include their own memory and a local processor to control the operation of the peripheral device controller and the peripheral devices to which it is attached. One type of peripheral device controller may be coupled to a plurality of mass storage devices, such a disk drives. A peripheral device controller for a disk drive system includes respective host adapters for coupling to the host processors, and one or more disk adapters, each coupled to one or more disk drives. These adapters are all coupled together via a local bus.

In some such computer systems it is absolutely necessary that data be stored in such a manner that it will not be lost in the event of a failure of a portion of the computer system. This is generally accomplished by providing redundant hardware and/or storing multiple copies of the data. For example, in a disk drive system, a host computer desiring to store data on the disk drives transfers a copy of that data from its memory to the disk drive controller. The disk drive controller stores in its local memory two copies of the data in two different places. Only when the two copies of the data have been made and their accuracy verified is the host processor notified that the data was successfully received by the disk drive system. The disk drive controller then transfers the data from the local memory to the disk drives in such a manner that it may be recovered, even if a disk drive should fail, for example using a RAID arrangement.

Both of these transfers of data are generally made under the control of direct memory access (DMA) controllers in a known manner. A DMA data transfer takes place independently of the program being executed by the processor (either host or local), and can occur at the full burst throughput rate of the host system bus. DMA transfers are generally initiated by providing the DMA controller with: (1) a starting address of the location in the host processor memory containing the data to be sent to the disk drive system (termed the source address); (2) either the amount of data to be transferred, or the ending address the data in the host processor memory (the end address); and (3) the I/O address of the disk drive controller to which it is desired to send the data (the destination address). The DMA controller then requests the host processor to grant it access to the system bus. When access is granted, the DMA controller enables a burst of data of a predetermined size to be transferred by accessing the host processor memory. More specifically, the DMA controller conditions the host memory to place data on the system bus, by placing a memory address on the system bus, conditioning the host memory to place data from the addressed location on the system bus, and simultaneously conditioning the disk drive system to store the data from the system bus in it's local memory. When this transfer is complete, the address is incremented, and the DMA cycle repeated until all the desired data has been transferred, all in a known manner.

If the block of data to be written is large, the transfer of the data from the host computer system to the disk drive controller, and the copying of that data within the disk drive controller can take a relatively long time, and the transfer of that data to the disk drives themselves does not start until the data has been completely and successfully received by the disk drive controller. However, it is possible that sufficient data is received to begin a transfer from the disk drive controller to the disk drives within a relatively short period of time. It is desirable to begin transfer of data from the memory in the disk drive controller to the disk drives as soon as there is sufficient data to do so to minimize the delay from the start of the data transfer from the host computer system until the data is safely written onto the disk drives.

BRIEF SUMMARY OF THE INVENTION

In accordance with principles of the present invention an address triggered DMA controller includes a DMA engine for controlling transfer of data between an external device and locations in a memory designated by respective addresses. Such a DMA controller also includes a DMA monitor for monitoring the respective addresses, and if one of the respective addresses matches a predetermined value, generating a signal to indicate a match.

An address triggered DMA controller according to the invention monitors the memory addresses of the data being transferred via DMA, and when the memory address matches a value, a match indicative signal is generated. In the above example, the predetermined address may be set to the size of a sector, or cluster, or other unitary block of data for the disk drive system. When the address corresponding to the end of such a block is accessed, a signal is generated, indicating that a block of data has been received by the disk drive controller and stored in the local memory. In response to that signal, the disk drives may be conditioned to initiate transfer of that block of data from the local memory to the disk drives themselves. In the meantime, the transfer of the data from the host processor to the disk drive controller may continue. The predetermined address may also be adjusted to indicate receipt of a second disk drive data block and the disk drives notified of the receipt of a second data block, and so on. In this manner, the latency between receipt of data to be stored on disk drives, and the transfer of that data to the disk drives may be minimized.

DETAILED DESCRIPTION OF THE INVENTION

Figure 1:
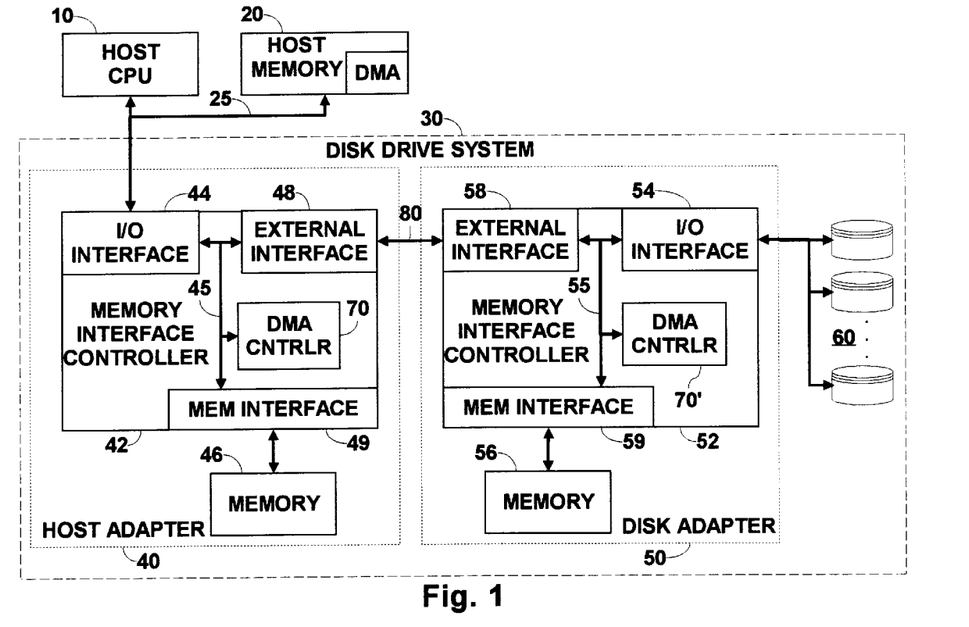
FIG. 1 is a block diagram of a computer system incorporating the present invention.

FIG. 1 is a block diagram of a computer system incorporating the present invention. In FIG. 1, a host central processing unit (CPU) 10 and a host memory 20, including a DMA controller, are coupled together by a system bus 25. A disk drive system 30 is also coupled to the system bus 25. The disk drive system 30 contains a host adapter 40 coupled to the system bus 25, and a disk drive adapter 50 coupled to disk drives 60. The disk drive system 30, the host adapter 40, and/or the disk drive adapter 50 may also include a local processor (not shown) to control their operation in a known manner.

The system bus 25 is coupled to a memory interface controller 42 within the host adapter 40, and specifically to an I/O interface 44 in the memory interface controller 42. The I/O interface 44 is coupled to an external interface 48, a memory interface 49 and a DMA controller 70 within the memory interface controller 42 via an internal bus 45. The memory interface controller 49 is coupled to a local memory 46 within the host adapter 40. The external interface 48 is coupled to the disk drive adapter 50 via a local bus 80.

The disk drive adapter 50 also includes a memory interface controller 52. The local bus 80 is coupled to the memory interface controller 52 in the disk drive adapter 50, and specifically to an external interface 58 in the memory interface controller 52. The external interface 58 is coupled to an I/O interface 54, a memory interface 59 and a DMA controller 70' within the memory interface controller 52 via an internal bus 55. The memory interface 59 is coupled to a memory 56 within the disk drive adapter 50. The I/O interface 54 is coupled to a plurality of disk drives 60.

In operation, the host CPU 10 executes a program stored in the host memory 20 in a known manner. This program includes instructions to generate data and store that data on the disk drives 60. This data is stored in a block in the host memory 20 starting and ending at respective known locations. The DMA controller in the host memory 20 is conditioned to control the transfer of the data block from the host memory 20 to the disk drive system 30. The DMA controller in the host memory 20 is supplied with the address of the starting location in the host memory 20 of the data block, the address of the ending location of the data block, data specifying the disk drive system 30 as the destination for the data, and an address in the host adapter memory 46 which will receive the data block. The DMA controller in the host memory 20 then controls the transfer of the data from the host memory 20 to the disk drive system 30 in a known manner. The host adapter 40 in the disk drive controller 30 receives the data from the host memory 20 via the I/O interface 44. The I/O interface 44 supplies the data via the internal bus 45 to the memory interface 49, which, under control of the DMA controller in the host memory 20, stores that data in the specified location in the memory 46.

When the data has been received, and stored in the memory 46 of the host adapter 40, a copy is made in the disk drive adapter 50, e.g. for reliability purposes, as described above. In order to make a copy of the data, the memory interface controller 42 in the host adapter 40 conditions the DMA controller 70 to transfer the block of data just received from the host memory 20 from its location in the memory 46 to the memory 56 in the disk drive adapter 50. The DMA controller 70 is supplied with the address of the starting location in the host adapter memory 46 of the data block, the address of the ending location of the data block, data specifying the external interface 48 as the destination of the data, and an address in the memory 56 in the disk drive adapter 50 at which this copy of the data block is to be stored. Under control of the DMA controller 70, the memory interface 49 retrieves the data from the memory 46, and supplies that data to the external interface 48, in a known manner. The data from the external interface 48 of the host adapter 40 is supplied to the external interface 58 of the disk drive adapter 50 via the local bus 80. Under control of the DMA controller 70, the external interface 58 supplies the data it receives to the memory interface 59, which stores it in the specified location in the memory 56, in a known manner.

While the transfer of data from the external interface 58 to the memory 56 is in progress, the DMA controller 70' is monitoring the addresses in the memory 56 at which data is being stored in a manner to be described in more detail below. When the memory 56 address matches a predetermined value, then a signal is generated to indicate a match. In the illustrated embodiment, the predetermined value is set so that a match indicative signal is generated when an amount of data equal to a sector, cluster, or other physical or logical block size for the disk drives 60 has been received, and stored in the memory 56. The DMA controller 70' supplies this signal to the I/O interface 54 to indicate that there is sufficient data for a transfer to begin from the memory 56 to the disk drives 60. The I/O interface 54 may then be conditioned to begin transferring that data from the memory 56 to the disk drives 60 immediately, while the remainder of the data is being transferred from the host adapter 40 to the disk drive adapter 50.

A DMA controller 70' operating in this manner, and fabricated in the manner described in more detail below, can minimize the latency of the data storage operation from the time it is initiated by the host CPU 10 until the data is actually stored on the disk drives 60.

Figure 2:
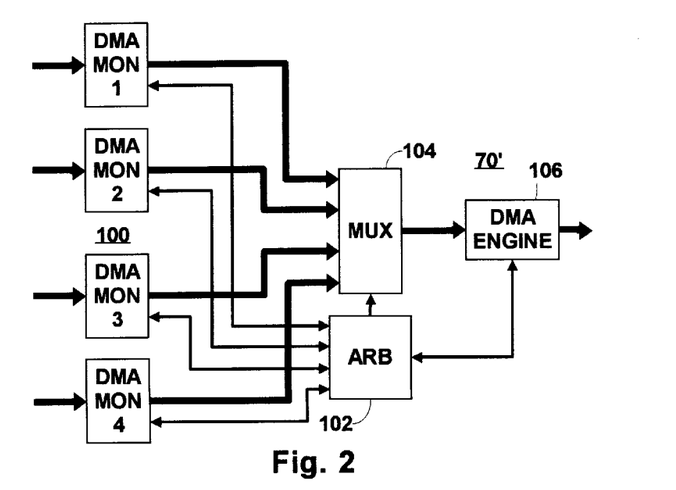
FIG. 2 is a block diagram of a DMA controller according to the present invention.

FIG. 2 is a block diagram of DMA engine 70' in the disk drive adapter 50 (of FIG. 1). It is envisioned that all DMA controllers in the computer system will be constructed identically. In FIG. 2, the DMA controller 70' includes four ports. Each of the ports is represented by one of four DMA monitors 100. Respective input terminals of the DMA monitors 100 are coupled to internal bus 55, to which memory 56, and the external interface 58, respectively, are coupled. Respective output terminals of the DMA monitors 100 are coupled to corresponding input terminals of a multiplexer 104. An output terminal of the multiplexer 104 is coupled to an input terminal of a DMA engine 106. An output terminal of the DMA engine 106 is coupled to the internal bus 55.

Each of the DMA monitors 100 also has a bidirectional arbitration terminal. The respective arbitration terminals of the DMA monitors 100 are coupled to corresponding terminals of an arbitrator circuit 102. A control output terminal of the arbitrator circuit 102 is coupled to a control input terminal of the multiplexer 104, and a bidirectional control terminal is coupled to a corresponding terminal of the DMA engine 106.

In general, a block of data is transferred between the memory 56 and the external interface 58 as a series of smaller DMA burst transfers. Each DMA burst transfer transfers a predetermined amount of data. DMA burst transfers are repeated until the entire data block has been transferred.

In operation, each one of the DMA monitors 100, representing a respective port of the DMA controller 70', holds data representing the current state of the DMA transfer being controlled or monitored by that port. In the case where one of the DMA monitors 100 desires to control a DMA burst transfer, it sends a DMA request signal to the arbitrator circuit 102. The arbitrator circuit 102 selects one of the requesting DMA monitors 100 using known arbitration techniques, and sends a DMA grant signal back to a selected one of the DMA monitors 100. The arbitrator circuit 102 simultaneously sends a control signal to the multiplexer 104 conditioning it to couple the output terminal of the selected one of the DMA monitors 100 to the input terminal of the DMA engine 106. That output terminal provides data to the DMA engine 106 representing the current state of the DMA transfer being monitored by that DMA monitor. This data includes the address in the memory 56 of the next location in the data block to be transferred, the address in the memory 56 of the end of the data block to be transferred, and the destination of the data, among other data to be described below. The arbitrator circuit 102 then sends a GO signal to the DMA engine 106.

In response to the data received from the selected one of the DMA monitors 100 and the GO signal, the DMA engine 106 performs a DMA burst transfer. For each such DMA burst transfer, the DMA engine makes a request to acquire control of the portion of the internal bus 55 coupled to the appropriate one of the external interface 58 or the memory interface 59. When that request is granted, the DMA engine 106 places a series of memory addresses on the bus, and conditions the memory 56 to retrieve the data from the addressed location in the memory 56 and supply the retrieved data to the external interface 58. This continues for the number of memory accesses in the DMA burst transfer. When the burst transfer is over, the data in the selected one of the DMA monitors 100 is updated to reflect the status of the overall DMA transfer at the end of the DMA burst transfer.

In the case of a DMA write operation performed under the control of an external DMA controller (e.g. DMA controller 70 of the host adapter 40), while the DMA burst transfer is underway, a selected one of the DMA monitors 100 monitors the DMA addresses generated by the external DMA controller. If an address matches a predetermined address, the selected one of the DMA monitors 100 generates a signal to indicate that a match has occurred. This signal is in transmitted in the form of a DMA REQ to the arbitrator circuit 102. As before, the arbitrator circuit 102, eventually grants access to the DMA engine 106 to the requesting one of the DMA monitors, and couples its output terminal to the input terminal of the DMA engine 106 via the multiplexer 104. Then the arbitrator issues a DMA GO signal.

The DMA engine 106, in response to the data supplied by the selected one of the DMA monitors 100, and the DMA GO signal from the arbitrator circuit 102, notifies either the external interface 58 or the memory interface 59 of the match. This notification may include specific data to be transferred to the external interface 58 or memory interface 59, in a manner to be described in more detail below. The external or memory interface may take appropriate action based on this data.

Figure 3:
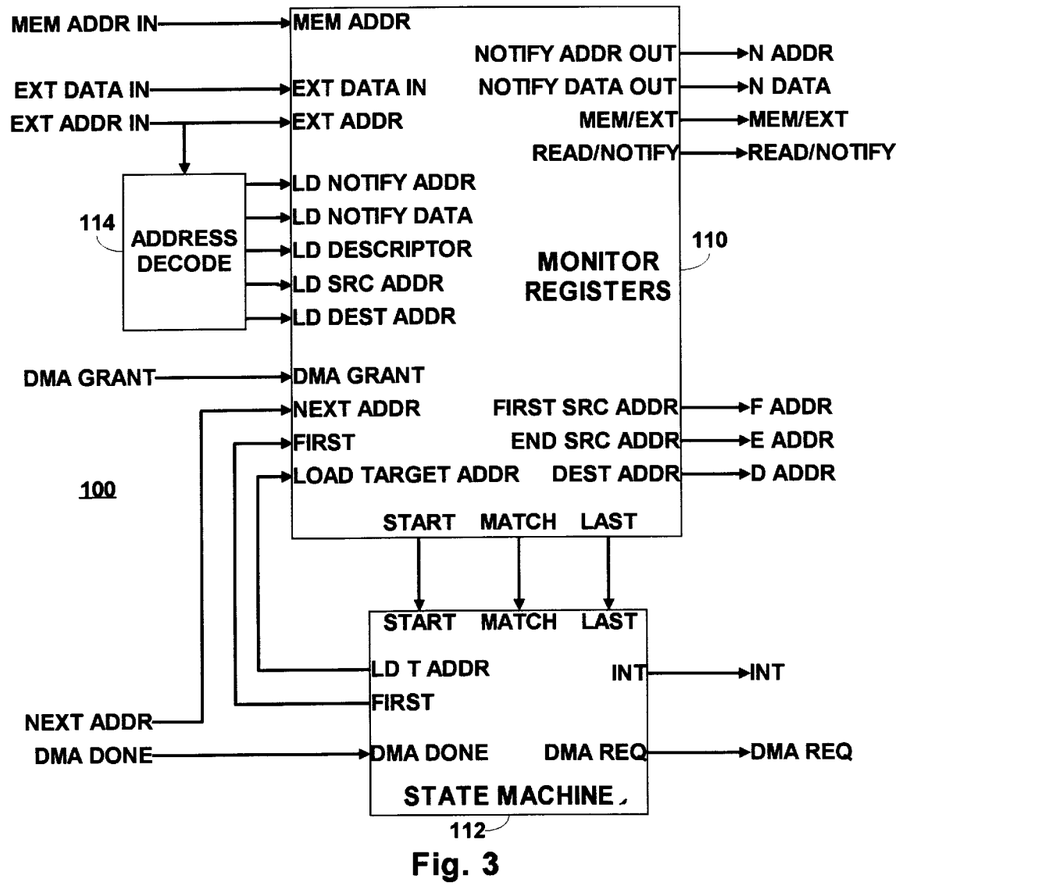
FIG. 3 is a block diagram of a DMA monitor illustrated in FIG. 2.

FIG. 3 is a block diagram of a DMA monitor illustrated in FIG. 2. In FIG. 3, a monitor registers block 110 is coupled to signals from the internal bus 55. Specifically, an address terminal, MEM ADDR IN, from the memory 56 (of FIG. 1, not shown) is coupled to a memory address input terminal, MEM ADDR, of the monitor registers block 110. A data terminal, EXT DATA IN, from the external interface 58 is coupled to an external data input terminal of the monitor registers block 110. And an external address terminal, EXT ADDR IN, also from the external interface 58, is coupled to respective input terminals of the monitor registers 110 and an address decoder 114.

The address decoder 114 generates a plurality of register load signals in response to the external interface address signal in a known manner. Specifically, a load notification address signal, a load notification data signal, a load descriptor signal, a load source address signal, and a load destination address signal are all generated in response to the external address signal by the address decoder 114. The respective load signals are coupled to corresponding input terminals of the monitor registers block 110. These load signals are supplied to load input terminals of respective registers within the monitor registers block 110, as will be described in more detail below, and condition those registers to load data. In a preferred embodiment, these address are sequential addresses so these registers may all be loaded with one burst transfer from the external interface 58.

A DMA grant signal is generated by the arbitrator circuit 102 of FIG. 2, and is supplied to a DMA grant input terminal of the monitor registers 110. In addition, a next address signal (NEXT ADDR), and a DMA done signal are generated by the DMA engine 106 (of FIG. 2). The next address, NEXT ADDR, signal is supplied to a corresponding input terminal of the monitor registers block 110 via the arbitration circuit 102. The DMA done signal is supplied to a corresponding input terminal of a monitor state machine 112 also via the arbitration circuit 102.

The monitor registers block 110 generate a notification address signal NOTIFY ADDR OUT and a notification data signal NOTIFY DATA OUT. These signals are routed to the external interface 58 (of FIG. 1) or the memory interface 59 when a memory address in a DMA write operation matches a predetermined value, in a manner to be described in more detail below. A memory/external signal MEM/EXT indicates whether the interface to be notified is on the external interface 58 or the memory interface 59. The read/notify signal, READ/NOTIFY, is a bistate signal which indicates whether a DMA read operation is in progress, in which case, no notification is made; or a DMA write operation is in progress (under the control of an external DMA controller), in which case, notification is made when the DMA memory address matches a predetermined address.

The monitor registers block 110 further generates address signals for direct use by the DMA engine 106 (of FIG. 2) in DMA read operations. A first memory address signal F ADDR contains the address of the starting memory location for the next DMA burst transfer. The end memory address signal E ADDR contains the address of the ending memory location of the overall DMA transfer, and the destination address signal D ADDR contains the address at the destination for the next DMA burst transfer. The DMA engine 106 uses the values of these signals to perform a DMA burst transfer. When the DMA burst transfer is complete, the DMA engine 106 conditions the monitor registers 110 to update the values of these signals in a manner to be described in more detail below.

The monitor registers 110 cooperate with the monitor state machine 112 to operate properly. To this end, the monitor registers 110 generate three control signals which are coupled to corresponding input terminals of the monitor state machine 112. A START signal, a MATCH signal, and a LAST signal. The monitor state machine 112, in turn, generates control signals for the monitor registers block 110. A load target address signal LD T ADDR, and a FIRST signal are coupled to corresponding input terminals of the monitor registers block 110. A DMA request signal DMA REQ is coupled to the arbitrator circuit 102, and an interrupt signal INT provides an indication that the DMA transfer represented by this monitor is completed. This signal may be coupled to the local processor (not shown) in the disk drive adapter 50 or in the disk drive system 30, in a known manner. The operation of the DMA monitor 100 will be described in more detail below.

Figure 4:
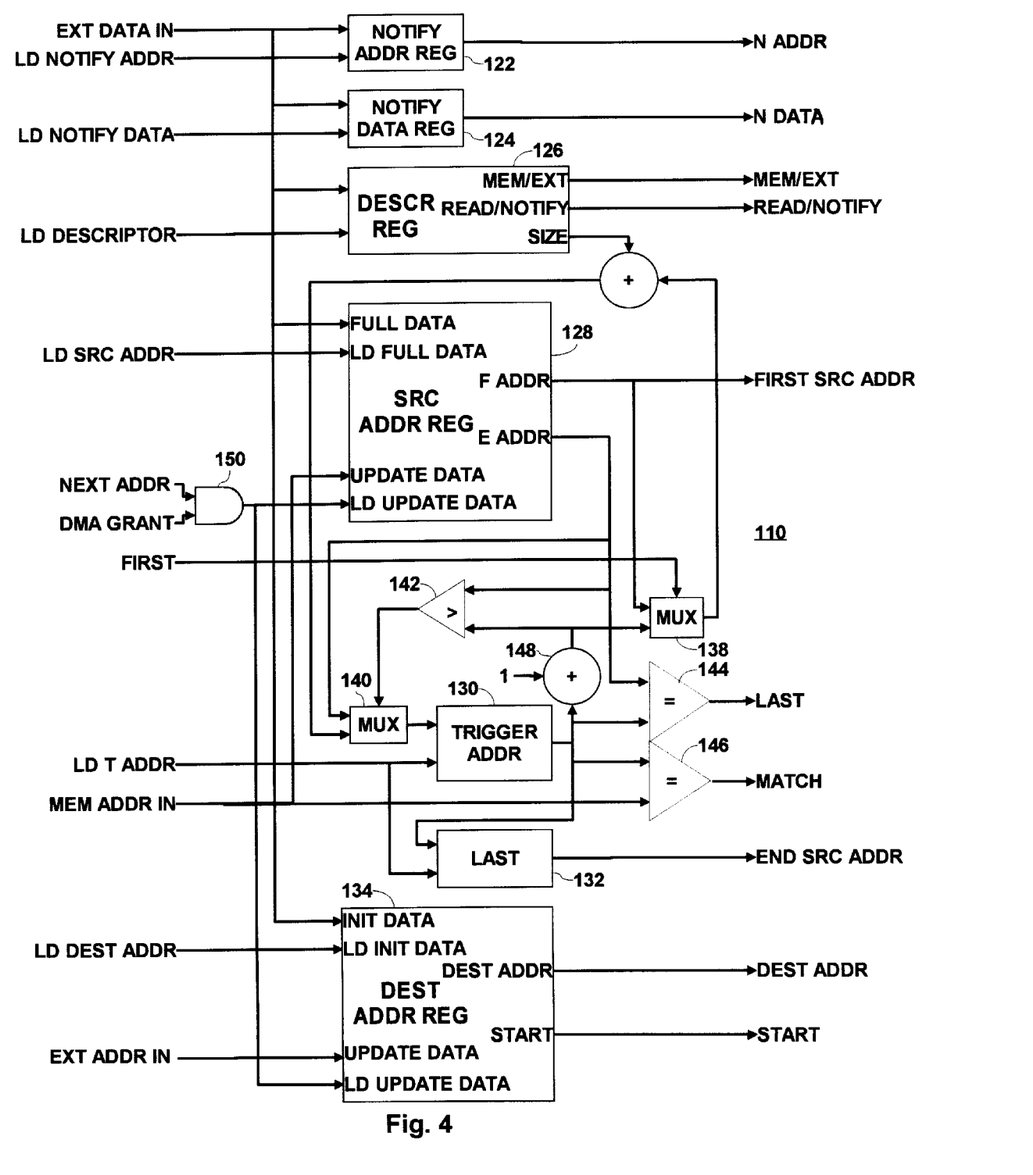
FIG. 4 is a more detailed block diagram of the monitor register block illustrated in FIG. 2.

FIG. 4 is a more detailed block diagram of the monitor register block 110 illustrated in FIG. 2. In monitor register block 110 in FIG. 4, there are seven registers which contain data specifying the parameters of the DMA operation to be performed. Five registers receive values from the external interface 58 (of FIG. 1). The other two registers receive values derived from the values held in the first five registers. The external data input terminal EXT DATA IN is coupled to respective data input terminals of a notification address register (NOTIFY ADDR REG) 122, a notification data register (NOTIFY DATA REG) 124, a DMA descriptor register (DESCR REG) 126, a source address register (SRC ADDR REG) 128 and a destination address register (DEST ADDR REG) 132. The load notification address register input terminal (LD NOTIFY ADDR) is coupled to a load input terminal of the load notification address register 122. The load notification data register input terminal (LD NOTIFY DATA) is coupled to a load input terminal of the load notification data register 124. A load DMA descriptor register input terminal (LD DESCRIPTOR) is coupled to a load input terminal of the DMA descriptor register 126. A load source address register input terminal (LD SRC ADDR) is coupled to a load full data input terminal (LD FULL DATA) of the source address register 128, and a load destination address register input terminal (LD DEST ADDR) is coupled to a load initial data input terminal (LD INIT DATA) of the destination address register 134.

An output terminal of the notification address register 122 is coupled to a notification address output terminal (N ADDR), and an output terminal of the notification data register 124 is coupled to a notification data output terminal (N DATA). The descriptor word, loaded into the DMA descriptor register contains three fields. A first field MEM/EXT contains data specifying whether notification should be sent to the memory interface 59 or the external interface 58 when a match occurs between a DMA memory address and a predetermined address value. The second field contains data specifying whether the DMA operation is a read operation, in which case no notification is to be done, or a write operation, in which case notification occurs in the event of a match of a DMA address and a predetermined address. The third field contains a size parameter. In the illustrated embodiment, this size parameter is used to derive the address to be matched to the DMA memory address, in a manner to be described in more detail below. A MEM/EXT output terminal of the DMA descriptor register 126 produces the MEM/EXT field of the DMA descriptor data, and is coupled to a MEM/EXT output terminal. A READ/NOTIFY output terminal of the DMA descriptor register 126 produces the READ/NOTIFY field of the DMA descriptor data, and is coupled to a READ/NOTIFY output terminal. A SIZE output terminal of the DMA descriptor register 126 produces the size field of the DMA descriptor data, and is coupled to a first input terminal of a first adder 136.

The source address data loaded into the source address register 128 contains two fields. A first field contains the address of the starting memory location for the DMA transfer. This is the starting location in the memory 58 (of FIG. 1) from which data will be retrieved and supplied to the external interface 58 (for a DMA read operation) or into which data from the external interface 58 will be stored (for a DMA write operation). A second field contains the address of the ending memory location for the DMA transfer. A first address output terminal (F ADDR) of the source address register 128 is coupled to a first source address output terminal (FIRST SRC ADDR), and to a first data input terminal of a first multiplexer 138. An ending address output terminal (E ADDR) of the source address register 128 is coupled to a first input terminal of a second multiplexer 140, a first input terminal of a first comparator 142, and a first input terminal of a second comparator 144.

An output terminal of the first comparator 142 is coupled to a control input terminal of the second multiplexer 140. An output terminal of the second multiplexer is coupled to a data input terminal of a trigger address register 130. The trigger register contains the value which is compared to the DMA memory address in order to generate a match signal. An output terminal of the trigger address register 130 is coupled to a second input terminal of the second comparator 144, a first input terminal of a third comparator 146, a first input terminal of a second adder 148, and a data input terminal of a last trigger address register 132. A second input terminal of the second adder 148 is coupled to a source of a signal representing the value '1', and operates as an incrementer. An output terminal of the second adder is coupled to a second input terminal of the first comparator 142, and a second data input terminal of the first multiplexer 138. An output terminal of the first multiplexer is coupled to a second input terminal of the first adder 136. An output terminal of the first adder 136 is coupled to a second data input terminal of the second multiplexer 140. A load trigger address register input terminal (LD T ADDR) is coupled to respective input terminals of the trigger address register 130 and the last trigger address register 132. An output terminal of the second comparator 144 is coupled to a LAST output terminal. An output terminal of the third comparator 146 is coupled to a MATCH output terminal, and an output terminal of the last trigger address register 132 is coupled to a ending source address output terminal (END SRC ADDR).

A NEXT ADDR input terminal is coupled to a first input terminal of an AND gate 150, and a DMA GRANT input terminal is coupled to a second input terminal of the AND gate 150. An output terminal of the AND gate 150 is coupled to respective load update data input terminals of the source address register 128 and the destination address register 134. A memory address input terminal (MEM ADDR IN) is coupled to an update data input terminals of the source address register 128 and a second input terminal of the third comparator 146. An external address input terminal (EXT ADDR IN) is coupled to an update data input terminal of the destination address register 134. An data output terminal of the destination address register 134 is coupled to a destination address output terminal DEST ADDR, and a start output terminal of the destination address register 134 is coupled to a start output terminal START.

The operation of the monitor register block 110 will be described below. However, referring to FIG. 2, it should be recalled that the multiplexer 104 couples the output terminals of a selected one of the DMA monitors 100 (illustrated in FIGS. 2, 3 and 4) to the input terminals of the DMA engine 106. The DMA engine 106 then performs a DMA burst transfer as controlled by the data received from the selected one of the DMA monitors 100.

Figure 5:
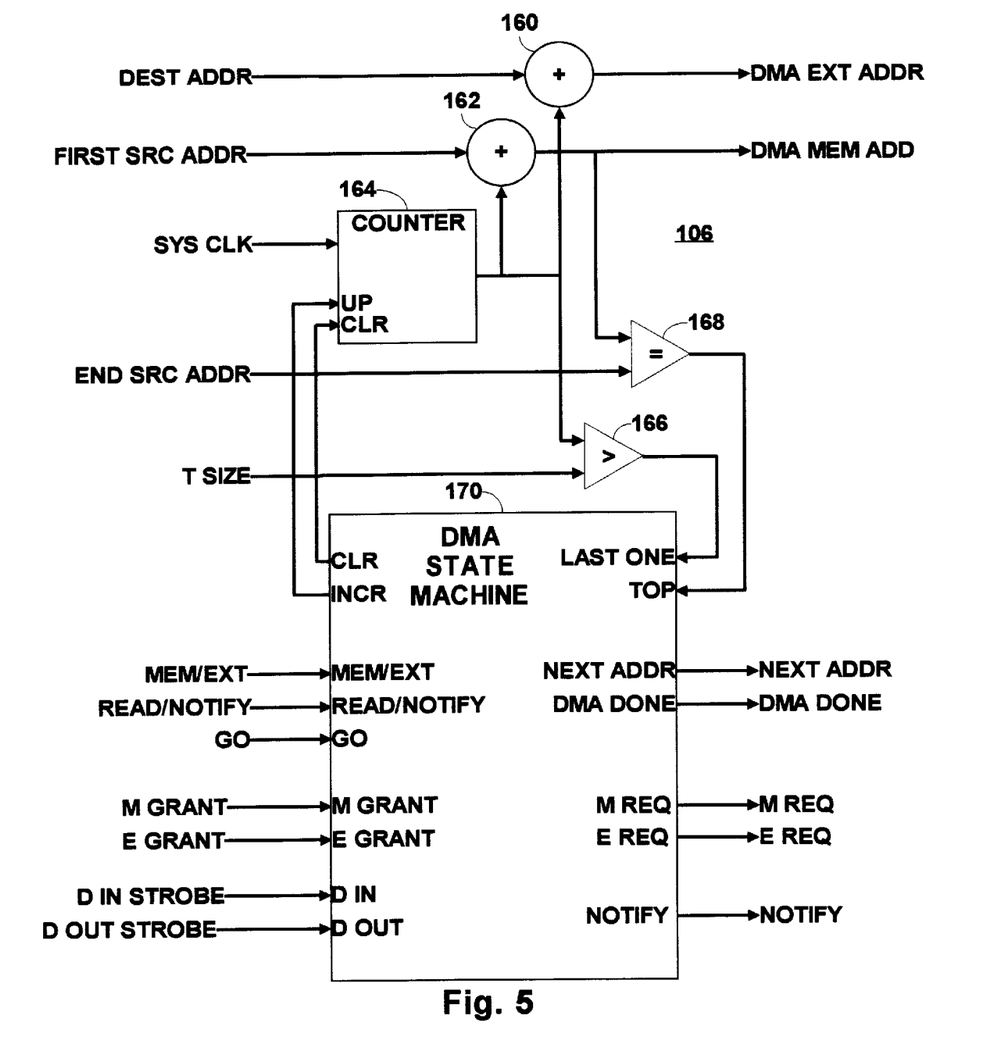
FIG. 5 is a more detailed block diagram of the DMA engine illustrated in FIG. 2.

FIG. 5 is a more detailed block diagram of the DMA engine 106 illustrated in FIG. 2. In FIG. 5, a destination address input terminal (DEST ADDR) from the selected monitor register 110 is coupled to a first input terminal of a first adder 160. A first source address input terminal (FIRST SRC ADDR) is coupled to a first input terminal of a second adder 162. A system clock input terminal (SYS CLK) is coupled to a clock input terminal of a counter 164. An output terminal of the counter 164 is coupled to respective second input terminals of the first and second adders, 160 and 162, and to a first input terminal of a first comparator 166. An output terminal of the first adder 160 is coupled to a DMA external address output terminal (DMA EXT ADDR). An output terminal of the second adder 162 is coupled to a DMA memory address output terminal (DMA MEM ADDR) and to a first input terminal of a second comparator 168.

An ending source address input terminal (END SRC ADDR) is coupled to a second input terminal of the second comparator 168. A source of a signal representing the size of the DMA burst transfer (T SIZE) is coupled to a second input terminal of the first comparator 166. An output terminal of the first comparator 166 is coupled to a LAST ONE input terminal of a DMA state machine 170, and an output terminal of the second comparator 168 is coupled to a TOP input terminal of the DMA state machine 170. A MEM/EXT output terminal and a READ/NOTIFY output terminal from the selected one of the DMA monitors 100 is coupled to a MEM/EXT input terminal and a READ/NOTIFY input terminal, respectively, of the DMA state machine 170. A next address output terminal (NEXT ADDR) and a DMA done output terminal (DMA DONE) are coupled in common to corresponding input terminals of all of the DMA monitors 100 (of FIG. 2).

The DMA state machine 170 generates a memory interface bus access request signal at output terminal (M REQ), which is coupled to the memory interface 59 (of FIG. 1), and an external interface bus access request signal at output terminal (E REQ), which is coupled to the external interface 58, in a known manner. The local processor (not shown) controlling these interfaces responds to these respective request signals by granting control of the corresponding buses to the DMA engine 106, and generating a corresponding memory interface bus access grant signal, M GRANT, and external interface bus access grant signal, E GRANT, in a known manner. A memory interface bus access grant signal input terminal M GRANT and an external interface bus access grant signal input terminal E GRANT are coupled to corresponding input terminals of the DMA state machine 170. In addition, a data input strobe signal and a data output strobe signal are generated whenever data has been moved into or out of the memory interface controller 52 of the disk drive adapter 50, respectively, in a known manner. A data input strobe signal input terminal D IN STROBE and a data output strobe signal input terminal D OUT STROBE, are coupled to corresponding input terminals of the DMA state machine 170.

The arbitrator circuit 102 (of FIG. 2) generates a GO signal when a DMA monitor 100 which requested DMA access has been granted such access (as described above). This GO signal is supplied to the DMA engine 106. A GO input terminal is coupled to a corresponding input terminal of the DMA state machine 170. The DMA state machine also generates a notify signal to indicate that the notification address and data should be supplied to the memory or external interface. The operation of the DMA engine 106 will be described in more detail below.

Figure 6:
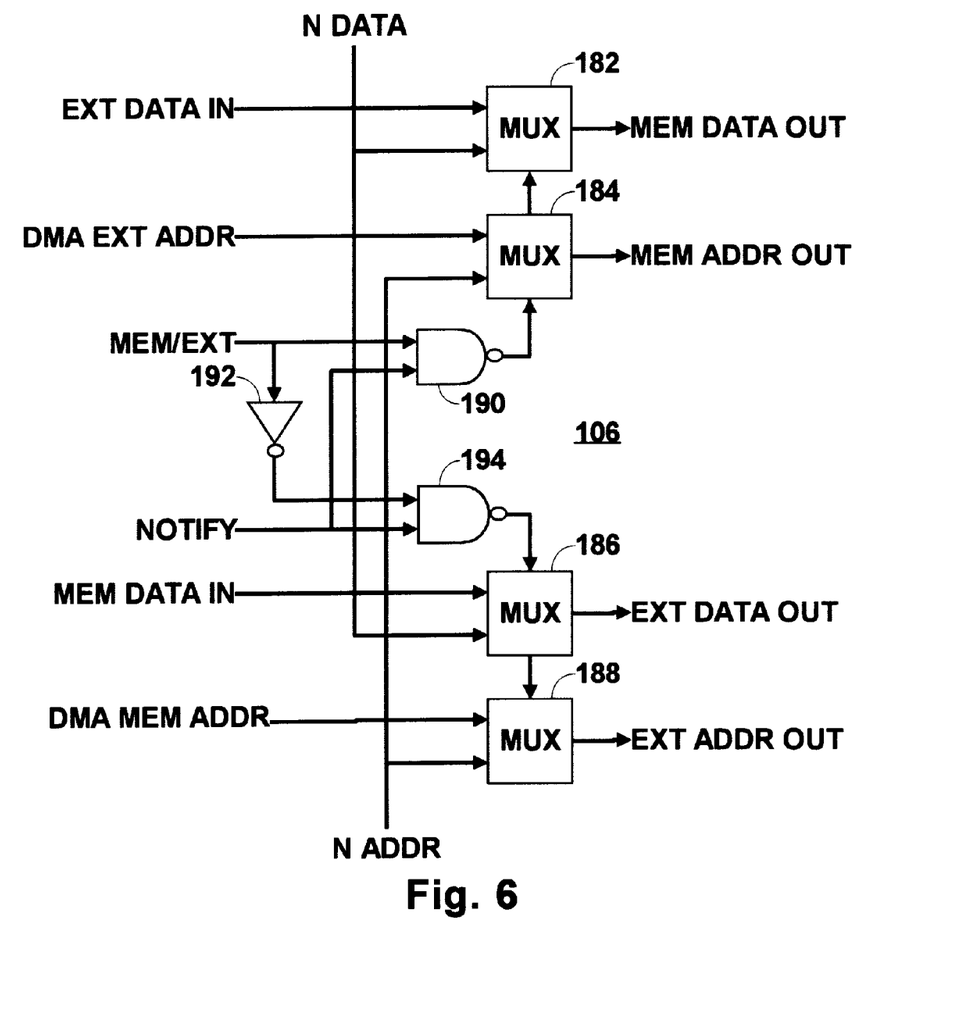
FIG. 6 is a more detailed block diagram of a routing circuit which is part of the DMA engine illustrated in FIG. 2.

FIG. 6 is a more detailed block diagram of a routing circuit which is part of the DMA engine 106 illustrated in FIG. 2. In FIG. 6, an external interface data input terminal, EXT DATA IN, is coupled to receive data from the external interface 58 (of FIG. 1) and is coupled to a first data input terminal of a first multiplexer 182. A DMA external address input terminal DMA EXT ADDR is coupled to receive the DMA external address signal from the first adder 160 (of FIG. 5) and is coupled to a first data input terminal of a second multiplexer 184. A memory data input terminal MEM DATA IN is coupled to receive data from the memory interface 59 and is coupled to a first input terminal of a third multiplexer 186. A DMA memory address input terminal DMA MEM ADDR is coupled to receive the DMA memory address signal from the second adder 162 and is coupled to a first data input terminal of a fourth multiplexer 188.

A notification address input terminal N ADDR is coupled to receive the notification address signal from the monitor registers 110 (of FIG. 3) and is coupled to respective second data input terminals of the second and fourth multiplexers, 184 and 188. A notification data input terminal N DATA is coupled to receive the notification data signal from the monitor registers 110 and is coupled to respective second data input terminals of the first and third multiplexers, 182 and 186. An output terminal of the first multiplexer 182 generates the data signal for the memory interface 59, and is coupled to a memory interface data output terminal MEM DATA OUT. An output terminal of the second multiplexer 184 generates the address signal for the memory interface 59, and is coupled to the memory interface address output terminal MEM ADDR OUT. An output terminal of the third multiplexer 186 generates the data signal for the external interface 58, and is coupled to the external interface data output terminal EXT DATA OUT. An output terminal of the fourth multiplexer 188 generates the address signal for the external interface 58, and is coupled to the external interface address output terminal EXT ADDR OUT.

A memory/external input terminal MEM/EXT is coupled to receive the select signal from the monitor registers 110 (of FIG. 3), and is coupled to a first input terminal of a first AND gate 190 and an input terminal of an inverter 192. An output terminal of the inverter 192 is coupled to a first input terminal of a second AND gate 194. A notification signal input terminal NOTIFY is coupled to receive the notify signal from the DMA state machine 170 (of FIG. 5) and is coupled to respective second input terminals of the first and second AND gates 190 and 194. An output terminal of the first AND gate 190 is coupled in common to respective control input terminals of the first and second multiplexers 182 and 184, and an output terminal of the second AND gate 194 is coupled in common to respective control input terminals of the third and fourth multiplexers 188. The operation of the routing circuitry illustrated in FIG. 6 will be described in more detail below.

The DMA engine described above with reference to FIGS. 1 through 6 operates in the manner to be described in more detail below. There are two basic modes of operation. In a read mode of operation, a DMA transfer reads data from the memory 56 and supplies it to the external interface 58. In a write mode of operation, an external DMA controller, controlling the external interface 58, (for example, the DMA controller 70 in the host adapter 40, in FIG. 2) writes data into the memory 56 by assuming control of the local bus 55. In the write mode of operation, the DMA controller 70' in the disk drive adapter 50 monitors the DMA operation, and generates a signal when data is stored to a predetermined address in the memory 56. The operation of the monitor state machine 112 illustrated in FIG. 3 is illustrated in the state diagram illustrated in FIG. 7, and the operation of the DMA state machine 170 illustrated in FIG. 5 is illustrated in the state diagram illustrated in FIG. 8.

Referring to FIG. 2, in general, parameters related to a DMA transfer are written into the registers in one of the DMA monitors 100. Once the DMA parameters are written, if the DMA controller 70' is to read data from the memory 56, that DMA monitor 100, then, requests DMA burst transfers be performed by the DMA engine 106 until the entire DMA transfer is completed, otherwise it begins to monitor the DMA write operation. Thus, it is the writing of the DMA transfer parameters into the registers in the DMA monitor 100 which initiates the operation of the DMA controller 70'. Referring to FIG. 4, the information required to initiate a DMA transfer is: (1) a description of the DMA transfer, which is stored in the DMA description register 126 by writing to the appropriate external interface address, as specified by the address decoder 114 (of FIG. 3); (2) the memory source addresses (of the starting and ending locations of the memory block involved in the DMA transfer), which is stored in the source address register 128; and (3) the external destination address involved in the DMA transfer, which is stored in the destination address register 134.

In the illustrated embodiment, these three registers are accessed by sequential external interface addresses, so they can be written in one burst access. Because it is envisioned that these registers will be written in order in one burst, the destination address register 134 includes circuitry which activates the START signal when it is written into. The start signal indicates that all data relating to a DMA transfer has been supplied to the DMA monitor registers 110, and is supplied to the monitor state machine 112, which begins operations as illustrated in FIG. 7.

Figure 7:
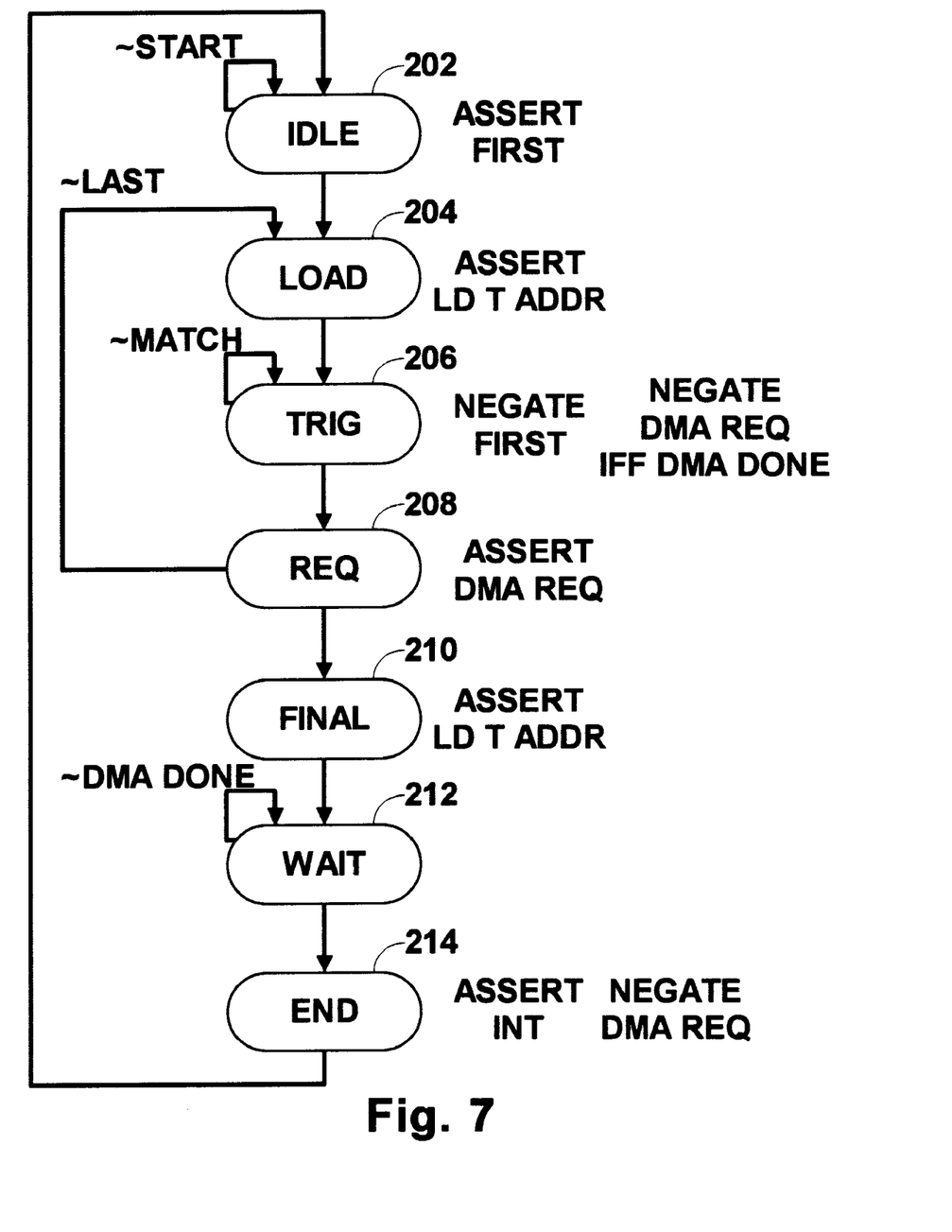
FIGS. 7 and 8 are state diagrams illustrating the operation of the monitor state machine illustrated in FIG. 3 and the DMA state machine illustrated in FIG. 5, respectively.

Referring to FIG. 7, the monitor state machine 112, when quiescent, is in the idle state 202. It remains in this state so long as the START signal in not asserted (remains negated), as indicated by the tilde preceding START. When in the idle state, a FIRST signal is asserted. Referring to FIG. 4, the FIRST signal generated by the monitor state machine 112 conditions the first multiplexer 138 to couple the first source address signal F ADDR from the source address register 128 to the second input terminal of the first adder 136. This address is the address of the first location in the memory 56 involved in the DMA transfer. The adder 136 adds a size parameter to this first address. For a DMA write operation to the disk drives, for example, the size parameter is preferably the size of a disk drive sector or cluster, although the value of the size parameter may be different. The address generated by the first adder 136 is the memory address of the end of the first sector's worth of data. When this address is generated during the DMA transfer, there is sufficient data in the memory 56 for a sector to be written to the disk drive. The MATCH signal generated (as described below), therefore, ultimately conditions the disk drive I/O interface 54 to begin the transfer of that first sector of data to the disk drives 60. The second multiplexer 140 is conditioned to couple this trigger address to data input terminal of the trigger address register 130.

When the START signal is asserted at the completion of writing the DMA transfer parameters into the appropriate monitor registers 110 in the DMA monitor 100, the monitor state machine 112 enters the load state 204. In this state, a LD T ADDR signal is asserted. The trigger address, generated as described above, is loaded into the trigger address register 130 in response to this signal. The address, thus, stored in the trigger address register 130 is the first predetermined address. When a DMA transfer occurs for this address, a match signal is generated in a manner to be described below.

When the trigger address has been stored in the trigger address register 130, the monitor state machine enters the trigger state 206. In this state, the FIRST signal is negated. Referring to FIG. 4, the second adder 148 adds one to the trigger address. In the illustrated embodiment, this produces the address of the beginning of the next sector's worth of data to be stored in the memory 56. The first multiplexer 138 is conditioned by the negated FIRST signal to couple this signal from the second adder 148 to the first adder 136. The SIZE parameter is added to the value to generate the ending address of the next sector's worth of data. This value is supplied to the second data input terminal of the second multiplexer 140. The last address of the full DMA transfer is coupled to the first data input terminal of the second multiplexer 140. The first comparator 142 compares the address produced by the second adder 148 (which is the address of the beginning of the next sector's worth of data.) to the address of the ending address of the full DMA transfer. If the ending address of the full DMA transfer is less than the calculated next trigger address, the output of the first comparator 142 conditions the second multiplexer 140 to couple the last DMA address, from the source address register 128, to the input of the trigger address register 130, otherwise, the address of the end of the next sector's worth of data, from the first adder 136, is coupled to the input of the trigger address register 130.

The DMA transfer, controlled by an external DMA controller (e.g. DMA controller 70 in the host adapter 40) stores data at sequentially addressed locations in the memory 56 in the disk drive adapter 50, and the DMA monitor 100 monitors this transfer. The monitor state machine 112 remains in the trigger state 206 so long as a MATCH signal is not generated. Referring to FIG. 4, the third comparator 146 compares the value in the trigger address register 130 (described above) to the memory address from the memory address input terminal (MEM ADDR IN). When the memory address matches the trigger address, the third comparator generates the MATCH signal. Referring to FIG. 7, when the MATCH signal is generated, the monitor state machine 112 enters the request (REQ) state 208. In the REQ state 208, the monitor state machine 112 generates a DMA REQ signal requesting a DMA access. Referring to FIG. 2, this signal is supplied to the arbitrator circuit 102. The arbitrator circuit 102 eventually grants a DMA access to this DMA monitor 100. As described above, a control signal is supplied to the multiplexer 104 coupling the F ADDR, E ADDR, D ADDR, MEM/EXT and READ/NOTIFY signals from the selected monitor register 110 to the DMA engine 106. The arbitrator circuit 102 further sends a DMA grant signal to the selected DMA monitor 100 and a GO signal the DMA engine.

Figure 8:
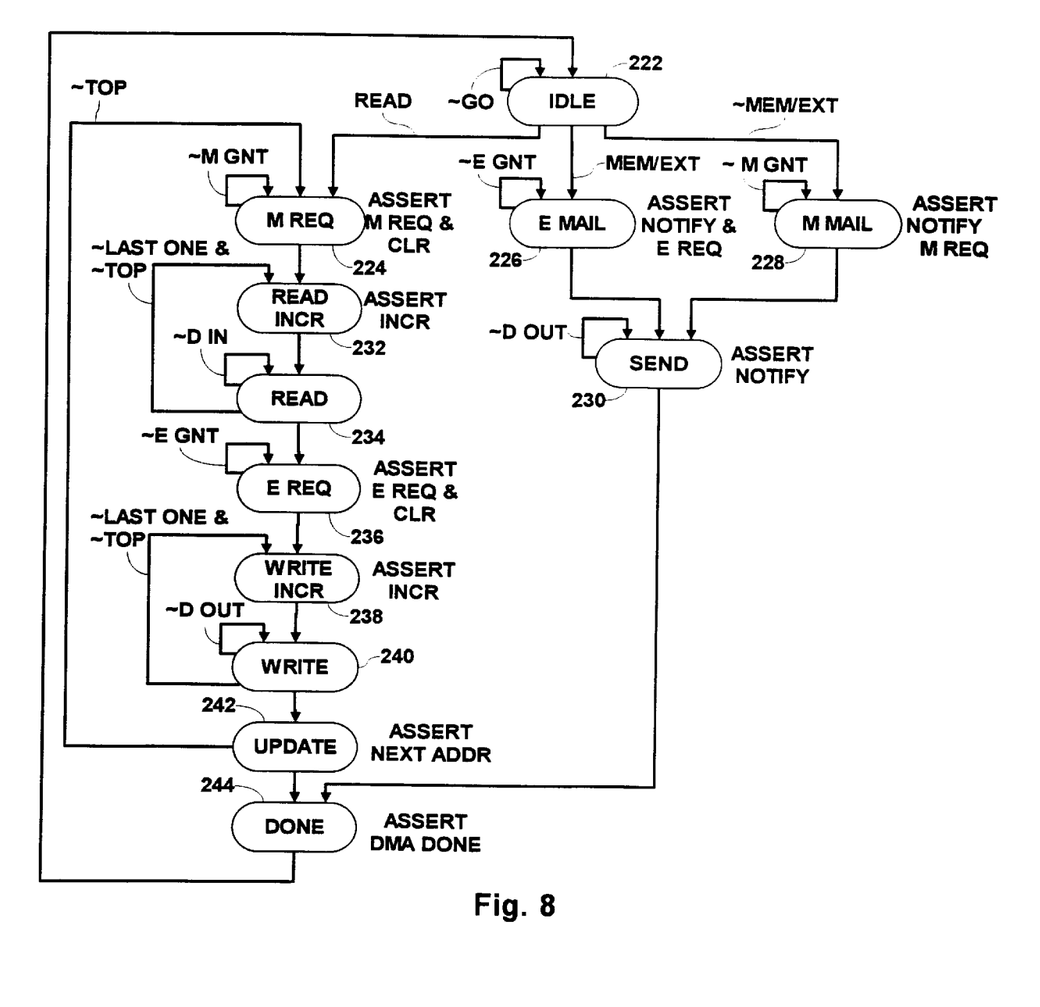

Referring now to FIG. 8, the DMA state machine 170 (of FIG. 5), when quiescent, is in the IDLE state 222. The DMA state machine remains in the IDLE state 222 so long as no GO signal is received from the arbitrator circuit 102 (of FIG. 2). When a GO signal is received, the state entered depends upon the READ/NOTIFY signal and the MEM/EXT signal. If a DMA read operation is in progress, the READ/NOTIFY signal indicates this, and the M REQ state 224 is entered to perform a DMA burst read operation. If a DMA write operation is in progress, then the READ/NOTIFY signal indicates this. In this case, if the MEM/EXT signal indicates that the external interface 58 (of FIG. 1) is to be notified, state E MAIL 226 is entered. In the E MAIL state 226, the NOTIFY signal is asserted, and a request to acquire control of the external interface bus, E REQ is generated by the DMA state machine 170 (of FIG. 5).

The DMA state machine remains in the E MAIL state 226 so long as no E GNT signal is received. The E GNT signal is generated by the controller (not shown) of the external interface 58 bus when access to the external interface 58 bus has been granted to the DMA engine 106. When the E GNT signal is generated, the DMA state machine enters the SEND state 230. In the SEND state 230, the NOTIFY signal and the MEM/EXT signal cooperate to properly gate the notification data and address to the external interface 58 bus, as described with reference to the routing circuitry (FIG. 6) above.

Referring to FIG. 6, in this case, the NOTIFY signal from the DMA state machine is asserted. Thus, both the first and second AND gates, 190 and 194, are enabled. The MEM/EXT signal is a logic '0' signal, which indicates that the external interface 58 bus is to be notified. In this case, the first AND gate 190 is disabled by the MEM/EXT signal, and the second AND gate 194 is enabled by the inverted MEM/EXT signal from the inverter 192. In response to the signal from the second AND gate 194, the third multiplexer 186 is conditioned to couple the notification data input terminal, N DATA, to the external interface 58 data output bus, and the fourth multiplexer 188 is conditioned to couple the notification address input terminal, N ADDR, to the external interface 58 address bus.

When the notification data has been successfully written to the notification address on the external bus, a data out signal D OUT is generated. The DMA state machine 170 remains in the SEND state 230 so long as the D OUT signal is not received. When the D OUT signal is received, indicating reception of the notification data and address, then the DMA state machine 170 enters the DONE state 244. In the DONE state 244, the DMA DONE signal is asserted by the DMA state machine 170. This is supplied to the DMA monitor state machine 112 (of FIG. 3). From the DONE state 244, the DMA state machine 170 reenters the IDLE state 222.

In a similar manner, if the MEM/EXT signal indicates that the memory interface 59 is to be notified, then the M MAIL state 228 is entered. In the M MAIL state 228 the NOTIFY signal and the MEM/EXT signal cooperate to couple the notification data and address to the memory interface 59 bus, as described above. In addition, a request is made to access the memory interface bus by asserting the M REQ signal, in the manner described above.

Referring again to FIG. 6, in this case, the NOTIFY signal from the DMA state machine is asserted, thus, both the first and second AND gates 190 an 194 are enabled. The MEM/EXT signal is a logic '1' signal, which indicates that the memory interface 59 bus is to be notified. In this case, the first AND gate 190 is enabled by the MEM/EXT signal, and the second AND gate 194 is disabled by the inverted MEM/EXT signal from the inverter 192. In response to the signal from the first AND gate 190, the first multiplexer 182 is conditioned to couple the notification data input terminal, N DATA, to the memory interface 59 data output bus, and the second multiplexer 184 is conditioned to couple the notification address input terminal, N ADDR, to the memory interface 59 address bus.

The DMA state machine 170 remains in the M MAIL state 228 so long as no M GNT signal, indicating that access to the memory interface 59 bus has been granted, is received. When an M GNT signal is received the DMA state machine enters the SEND state 230. As described above, the DMA state machine remains in the SEND state 230 until a data out signal D OUT is received, indicating that the notification data has been written to the notification address on the memory interface 59 bus. When the D OUT signal is received, then the DONE state 244 is entered, and a DMA DONE signal generated. From the DONE state, the IDLE state 222 is entered again. In this manner, the appropriate one of the external interface 58 or the memory interface 59 is notified that the predetermined DMA address was accessed, and is supplied with a specific address and data.

If the READ/NOTIFY signal indicates that a DMA read operation is in progress, the M REQ state 224 is entered, as described above. In a DMA read operation, a DMA burst of data is read from a location in the memory 56 and then that burst of data is written to the external interface 58. In the M REQ state 224, the M REQ signal is asserted, requesting access to the memory interface 59 bus, as described above. A CLR signal is also asserted. Referring to FIG. 5, the CLR signal clears the counter 164. The DMA state machine 170 remains in the M REQ state 224 so long as no M GNT signal is received.

When access is granted to the memory interface 59 bus, as indicated by the M GNT signal, the DMA state machine 170 enters the READ INCR state 232. In the READ INCR state 232, the INCR signal is asserted. Referring again to FIG. 5, the INCR signal causes the counter 164 to increment its value, to a value of '1' in this case. This value is added the first memory address signal F ADDR and the destination address signal D ADDR from the DMA monitor registers 110 in adders 162 and 160 respectively. The DMA state machine 170 then enters the READ state 234. The DMA state machine remains in the READ state 234 so long as no data in signal, D IN, (described below) is received.

The output of adder 160 (of FIG. 5) is coupled to the external interface 58 address bus and the output of adder 162 is coupled to the memory interface 59 address bus via the routing circuitry illustrated in FIG. 6. Referring now to FIG. 6, in this case, the NOTIFY signal from the DMA state machine remains negated. Consequently, both the first and second AND gates 190 an 194 remain disabled. The first multiplexer 182, thus, is conditioned to couple the external interface 58 data input bus to the memory interface 59 data output bus. The second multiplexer 184 is conditioned to couple the DMA external address from the DMA engine 106 (of FIG. 5) to the memory interface 59 address bus. The third multiplexer 186 is conditioned to couple the memory interface 59 data input bus to the external interface 58 data output bus. And the fourth multiplexer 188 is conditioned to coupled the DMA memory address from the DMA engine 106 to the external interface 58 address bus.

When data has been successfully read from the specified address of the memory 56, a data-in signal D IN is generated in a known manner. When the D IN signal is received, the DMA state machine 170 leaves the READ state 234. The destination depends on the values of a LAST ONE and a TOP signal, described below. Referring to FIG. 5, the first comparator 166 compares the value at the output of the counter 164 to a predetermined value T SIZE, which is the size of a DMA burst transfer. The results of this comparison is a bistate signal, LAST ONE which, when asserted indicates that the number of DMA transfers in the DMA burst have occurred, and which remains negated otherwise. The second comparator 168 compares the current DMA memory address from the second adder 162 to the address of the location in the memory 56 of the end of the data involved in the full DMA transfer, E ADDR, from the monitor registers 110 (of FIG. 3). The results of this comparison is a bistate signal, TOP, which, when asserted indicates that the end of the full DMA transfer has been reached, and there is no more data to transfer, and which remains negated otherwise. If either of these signals is asserted, there is no more data to transfer in the current DMA burst transfer.

Referring again to FIG. 8, so long as there remain DMA memory read transfers to make during this DMA burst, when a memory read is completed in the READ state 234, the DMA state machine 170 returns to the READ INCR state 232, where it increments the counter 164 in preparation for transferring the data in the next sequential memory 56 location. If however, either the memory read portion of this DMA burst transfer is completed, indicated by the assertion of the LAST ONE signal by the first comparator 166, or the full DMA transfer is completed, indicated by the assertion of the TOP signal by the second comparator 168, the DMA state machine 170 enters the E REQ state 236.

In the E REQ state 236, the E REQ signal is asserted, requesting that the controller (not shown) of the external interface 58 bus grant access of that bus to the DMA engine 106. In addition, the CLR signal is again asserted to clear the counter 164 (of FIG. 5). The DMA state machine 170 remains in the E REQ state 236 so long as no E GNT signal, indicating that access the external interface 58 bus has been granted, is received. When the E GNT signal is received, the DMA state machine 170 enters the WRITE INCR state 238.

In the WRITE INCR state 238, the INCR signal is asserted, incrementing the counter 164 (of FIG. 5). The DMA state machine 170 then enters the WRITE state 240. In the WRITE state 240, the data previously retrieved from the memory 56, as described above, is written to the external interface 58. When the write to the external interface 58 is completed, a data-out signal D OUT is generated, as described above. The DMA state machine 170 remains in the WRITE state 240 so long as the D OUT signal is not received. When the D OUT signal is received, the DMA state machine 170 leaves the WRITE state 240. So long as there remain DMA transfers to make during this DMA write burst (as indicated by negated LAST ONE and TOP signals, described above), the DMA state machine 170 returns to the WRITE INCR state 238, where it increments the counter 164 in preparation for writing the data from the next sequential memory 56 location to the external interface 58. If however, either this DMA write burst transfer is completed, indicated by the assertion of the LAST ONE signal by the first comparator 166 (of FIG. 5), or the full DMA transfer is completed, indicated by the assertion of the TOP signal by the second comparator 168, the DMA state machine enters the UPDATE state 242.

In the UPDATE state 242, the NEXT ADD, signal is asserted. This signal is supplied to all of the DMA monitors 100 in common. Referring to FIG. 4, the DMA GRANT signal from the arbitrator circuit 102 (of FIG. 2) is supplied to the AND gate 150 of the selected DMA monitor 100. Thus, only the DMA monitor 100 which has been granted access to the DMA engine 106 will have its AND gate 150 enabled, and only in the selected DMA monitor 100 will the NEXT ADDR signal be supplied to the source address register 128 and the destination address register 134. In the selected DMA monitor 100, the NEXT ADDR signal conditions the source address register 128 to update the first source address field, F ADDR, by loading it from the contents of the memory interface 59 address bus, MEM ADDR IN, supplied from the second adder 162 of the DMA engine 106. The NEXT ADDR signal also conditions the destination address register 134 to update its contents with the contents of the external interface 58 address bus, EXT ADDR IN, supplied from the first adder 160 of the DMA engine 106. In this fashion, the selected DMA monitor 100 is prepared for the next DMA burst transfer to be performed by the DMA engine 106.

Referring again to FIG. 5, if the TOP signal from the second comparator 168 is not asserted, indicating that the full DMA transfer is not completed yet, the DMA state machine 170 reenters the M REQ state 224 to prepare to make another DMA burst transfer. If, however, the TOP signal is asserted, indicating that the full DMA transfer is completed, then the DMA state machine 170 enters the DONE state 244. In the DONE state 244, the DMA DONE signal is asserted. This signal is supplied to the monitor state machine 112 (of FIG. 3) when the full DMA transfer is completed.

Returning now to FIG. 7, the DMA monitor 100 is monitoring a DMA write transfer controlled by an external DMA controller. In the TRIG state 206, the monitor state machine 112 (of FIG. 3) waits for a MATCH signal from the third comparator 146 (of FIG. 4), indicating that the memory address matches the trigger address. So long as no MATCH signal is received, the monitor state machine 112 remains in the TRIG state 206. When a MATCH signal is received, the monitor state machine enters the REQ state 208, where a DMA REQ signal is sent to the DMA engine 106. In response to this signal, the DMA engine 106 sends the notification data to the notification address on the designated one of the memory interface 59 or external interface 58, as described in detail above.

After the DMA REQ signal is generated in the REQ state 208, the monitor state machine 112 leaves the REQ state. The destination of the monitor state machine 112 depends upon whether the DMA transfer being monitored is completed. Referring again to FIG. 4, the second comparator 144 compares the trigger address from the trigger address register 130 to the last address of the full DMA transfer from the last DMA address field, L ADDR, of the source address register 128. If the current trigger address is equal to the last address in the full DMA transfer, the second comparator 144 asserts the LAST signal, otherwise the LAST signal remains negated. If the LAST signal is negated, this indicates that more sectors of DMA data are yet to be received. In this case, the monitor state machine 112 reenters the load state 204, in preparation for monitoring for the end of the next sector's worth of DMA data.

If the LAST signal is asserted, this indicates that the last sector's worth of data is being transferred at this time. In this case, the monitor state machine 112 enters the FINAL state 210. In the FINAL state 210, the load trigger address signal, LD T ADDR, is asserted. Referring again to FIG. 4, this causes the contents of the trigger address register 130 to be loaded into the last address register 132. The monitor state machine 112 then enters the WAIT state 212. In the WAIT state 212, the monitor state machine monitors the DMA DONE signal supplied from the DMA state machine 170 (DONE state 244), as described above. So long as the DMA DONE signal is not received, the monitor state machine remains in the WAIT state 212. When the DMA DONE signal is received, this indicates that the notification data has been successfully written to the notification address on the appropriate one of the memory interface 59 or the external interface 58, as illustrated in FIG. 8 (states 226–230).

When the DMA DONE signal is received, the monitor state machine enters the END state 214. In the END state 214, the INT signal is asserted to indicate that the DMA transfer currently being monitored is complete. Simultaneously, the DMA REQ signal, supplied to the arbitrator circuit 102 (of FIG. 2), is negated. The INT signal may, for example, be coupled to an interrupt mechanism of the local processor (not shown) of the disk drive adapter 50 or the disk drive system 30). The monitor state machine 112 then reenters the IDLE state 202.

Referring again to FIG. 4, the notification address register 122 and the notification data register 124 may be loaded at any time during a DMA transfer via the external interface 58 data input bus. This provides flexibility in responding to notification. For example, for an initial notification, the address and data may condition the disk drive I/O controller 54 (of FIG. 1) to begin to transfer the newly received sector of data from the memory 56 to the disk drives 60. After receipt of the first sector's worth of data, the notification address and data may be modified to condition the disk drive I/O controller 54 to wait until the first sector has been written to the disk drives 60 before attempting to write the second sector's worth of data to the disk drives.

The DMA controller described above can minimize the latency time between to time of reception of data from a host processor and the time that data is stored on the disk drives.

What is claimed is:

1. An address triggered DMA controller, comprising:
   a DMA engine for controlling transfer of data between an external device and locations in a memory designated by respective addresses and comprising a source address register, for storing data representing a current one of the respective addresses; and
   a DMA monitor for monitoring the respective addresses, and if the current one of the respective addresses matches a predetermined value, generating a signal to indicate a match, comprising:
   a trigger address register for storing the predetermined value;
   a descriptor register, for storing data indicating a predetermined amount of data;
   a comparator coupled to the trigger address register and the source address register for generating the match indicative signal; and
   calculating circuitry for storing a value in the trigger address register having the value of the sum of the descriptor register data and the trigger address register value.

2. An address triggered DMA controller, comprising:
   a DMA engine for controlling transfer of data between an external device and locations in a memory designated by respective addresses and comprising a source address register, for storing data representing a current one of the respective addresses; and
   a DMA monitor for monitoring the respective addresses, and if the current one of the respective addresses matches a predetermined value, generating a signal to indicate a match, and comprising:
   a trigger address register for storing the predetermined value;
   a comparator coupled to the trigger address register and the source address register for generating the match indicative signal;
   a descriptor register, for storing data indicating a predetermined amount of data; and
   calculating circuitry for storing a value in the trigger address register having the value of the sum of the descriptor register data and the trigger address register value and comprising:
   circuitry for calculating a new trigger address value having the value of the sum of the current value of the trigger address register and the descriptor register data, and
   circuitry for storing the new trigger address value in the trigger address register when the match indicative signal is generated.

3. The source address register of claim 2 wherein:
   the DMA engine further contains data representing an address of an ending location in the memory for the transferred data; and
   the calculating circuitry further comprises a comparator for comparing the new trigger address value to the address of the ending location; and
   circuitry, responsive to the match indicative signal, for storing the smaller of the new trigger address value or the address of the ending location in the trigger address register.

4. The DMA controller of claim 1 wherein the DMA controller is embodied in a disk drive system comprising a plurality of disk drives, and the predetermined amount of data is the amount of data in a sector of one of the plurality of disk drives.

5. The DMA controller of claim 1 wherein the DMA monitor comprises:
   a notification data register;
   a notification address register; and
   circuitry for producing the contents of the notification data register and the notification address register in response to the match indicative signal.

6. The DMA controller of claim 5 wherein the contents of the notification data register and the notification address register are supplied to the external device.

7. The DMA controller of claim 5 wherein the contents of the notification data register and the notification address register are supplied to the memory.

8. The DMA controller of claim 5 wherein:
   the DMA controller further comprises a register for storing data representing a notification selection signal; and
   the contents of the notification data register and the notification address register are selectively supplied to one of the external device and the memory in response to the notification selection signal.

9. The DMA controller of claim 1 wherein the match representative signal is supplied to the external device.

10. The DMA controller of claim 1 wherein the match representative signal is supplied to the memory.

11. The DMA controller of claim 1 wherein:
    the DMA monitor comprises a register for storing data representing a notification selection signal; and
    the match representative signal is selectively supplied to one of the external device and the memory in response to the notification selection signal.

* * * * *

UNITED STATES PATENT AND TRADEMARK OFFICE
CERTIFICATE OF CORRECTION

PATENT NO. : 5,185,634
DATED : February 9, 1993
INVENTOR(S) : Hideo MURAMATSU

It is certified that error appears in the above-identified patent and that said Letters Patent is hereby corrected as shown below:

Title page,
Delete "[76] Inventor: Minolta Camera Kabushiki Kaisha, 03, Osaka, Japan" and insert item [75] Inventor: Hideo Muramatsu, Osaka, Japan item [73] Assignee: Minolta Camera Kabushiki Kaisha, Osaka, Japan --

Signed and Sealed this

Ninth Day of November, 1993

Attest:

BRUCE LEHMAN

*Attesting Officer*     *Commissioner of Patents and Trademarks*